United States Patent [19]
Otoguro et al.

[11] Patent Number: 5,406,402
[45] Date of Patent: Apr. 11, 1995

[54] FAULTY OPERATION PREVENTION CIRCUIT FOR INFRARED-RAY REMOTE CONTROLLER

[75] Inventors: Yoshishige Otoguro; Masami Ota, both of Tokyo, Japan

[73] Assignee: Goldstar Co., Ltd., Seoul, Rep. of Korea

[21] Appl. No.: 162,621

[22] Filed: Dec. 7, 1993

[30] Foreign Application Priority Data

Dec. 7, 1992 [JP] Japan ................................. 4-326666

[51] Int. Cl.[6] ...................... H04B 10/08; H04B 10/80
[52] U.S. Cl. ..................... 359/110; 359/142; 340/825.72; 371/5.5; 348/734
[58] Field of Search ................... 359/110–111, 359/142, 146; 340/825.72, 825.69; 398/734; 375/10, 60; 371/5.5

[56] References Cited

U.S. PATENT DOCUMENTS

4,426,662  1/1984  Skerlos et al. ..................... 319/146

FOREIGN PATENT DOCUMENTS

0448152  9/1991  European Pat. Off. ............ 319/142

*Primary Examiner*—Herbert Goldstein
*Assistant Examiner*—Kinfe-Michael Negash

[57] ABSTRACT

A faulty operation prevention circuit for an infrared-ray remote controller comprising inverter for inverting a transmission signal from the infrared-ray remote controller, a first pulse generation circuit for generating pulses in response to an output signal from the inverter, each of the pulses having a first width, a noise identification unit for identifying an optical noise contained in the transmission signal from the infrared-ray remote controller in response to the output signal from the inverter and the output pulses from the first pulse generation circuit, the noise identification unit having first and second transistors, and a second pulse generation circuit for generating a pulse in response to an output signal from the noise identification unit, the pulse having a second width. A system body receives no transmission signal from the infrared-ray remote controller in response to the output pulse from the second pulse generation circuit when the optical noise is contained in the transmission signal from the infrared-ray remote controller. Therefore, a faulty operation of the system body can be prevented.

14 Claims, 3 Drawing Sheets

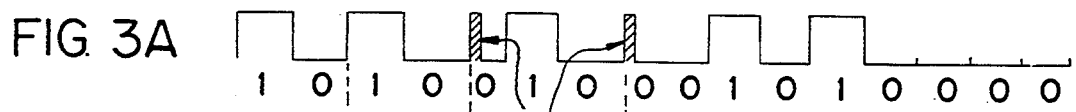
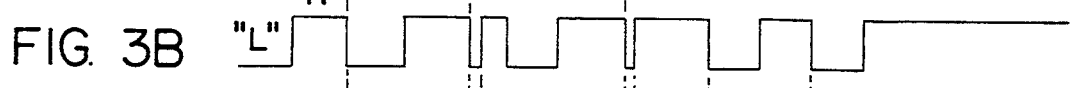
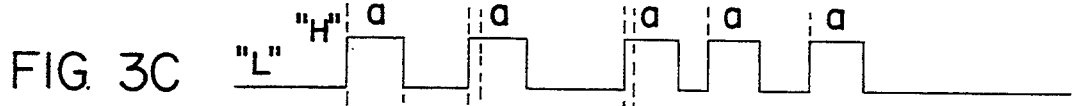
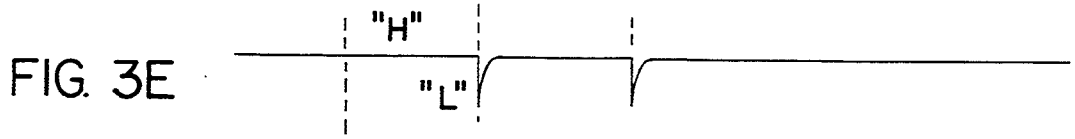
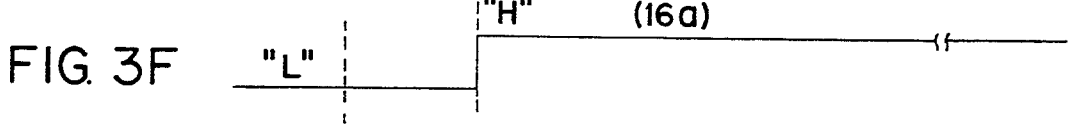
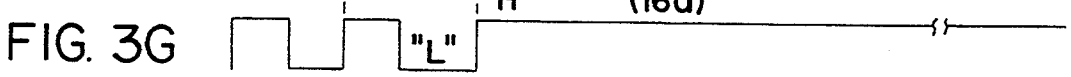

FAULTY OPERATION PREVENTION CIRCUIT FOR INFRARED-RAY REMOTE CONTROLLER

BACKGROUND OF THE INVENTION

1. Field of the Invention

The present invention relates to a faulty operation prevention circuit for an infrared-ray remote controller, which is disposed in a system body receiving a transmission signal from the infrared-ray remote controller.

2. Description of the Prior Art

Recently, in systems such as a microcomputer, a television receiver, an audio set, an air conditioner and the like, an infrared-ray remote controller has been provided to remotely control power ON/OFF, channel selection, volume adjustment etc. of the corresponding system (a system body). Generally, a transmitter of the infrared-ray controller transmits successively an infrared-ray signal in the form of digital information of "1" and "0" and a receiver of the system body receives the successive digital information from the transmitter of the infrared-ray remote controller, decodes the received digital information and controls the associated components of the system body in accordance with the decoded result.

However, various noise sources such as a fluorescent lamps and others may be present in the vicinity of the infrared-ray remote controller. For this reason, the transmission signal from the infrared-ray remote controller may be mixed with a noise of a level higher than a predetermined level. In this case, the digital information decoded in the receiver of the system body may be different transmitted by that from the infrared-ray remote controller. This results in a faulty operation of the system body.

FIG. 4 is a data format of the transmission signal from the infrared-ray remote controller and FIG. 5 is a data format of the transmission signal in FIG. 4 in which an optical noise is contained. As shown in these drawing, the transmission signal includes a START bit, CODE bits C1–C3, a SECOND bit, DATA bits A–E, an END bit and 4 redundancy bits.

FIG. 6, illustrates a schematic block diagram of a conventional remote control reception apparatus. As shown in this drawing, the conventional remote control reception apparatus comprises a remote control receiver 1 disposed in the system body. The remote control receiver 1 is adapted to receive the transmission signal (a remote control signal) from the infrared-ray remote controller, decode the received remote control signal and output the decoded signal to the associated components in the system body. For example, the remote control receiver 1 outputs the decoded signal in the form of pulse code to a microcomputer (not shown) in the system body. The microcomputer performs a proper operation based on the pulse code signal from the remote control receiver 1. As stated previously, the transmission signal from the infrared-ray remote controller may be mixed with the optical noise as shown in FIG. 5.

However, noise prevention means is not disposed at the output of the remote control receiver 1 in the remote control reception apparatus in FIG. 6. For this reason, in the case where the optical noise is mixed with the transmission signal from the infrared-ray remote controller as shown in FIG. 5 under the condition that the pulse code signal from the remote control receiver 1 is "0", the microcomputer recognizes the pulse code signal of "0" as "1". As a result, the faulty operation of the system body is caused. Noticeably, the detection of "H" and "L" levels ("1" and "0" levels in FIG. 5) of the transmission signal from the infrared-ray remote controller is repeatedly performed several times. With the optical noise mixed with the transmission signal in such a detection operation, the "L" level of the transmission signal may be detected as the "H" level.

SUMMARY OF THE INVENTION

Therefore, the present invention has been made in view of the above problem, and it is an object of the present invention to provide a faulty operation prevention circuit for an infrared-ray remote controller, in which a transmission signal from the infrared-ray remote controller is not received by a system body when it is mixed with an optical noise, so that a faulty operation of the system body can be prevented.

In accordance with the present invention, the above and other objects can be accomplished by providing a faulty operation prevention circuit for an infrared-ray remote controller comprising inversion means for inverting a transmission signal from said infrared-ray remote controller; first pulse generation means for generating pulses in response to an output signal from said inversion means, each of said pulses having a first width; noise identification means for identifying an optical noise contained in the transmission signal from said infrared-ray remote controller in response to the output signal from said inversion means and the output pulses from said first pulse generation means; and second pulse generation means for generating a pulse in response to an output signal from said noise identification means, said pulse having a second width; whereby a system body receives no transmission signal from said infrared-ray remote controller in response to the output pulse from said second pulse generation means when the optical noise is contained in the transmission signal from said infrared-ray remote controller, so that a faulty operation of the system body can be prevented.

BRIEF DESCRIPTION OF THE DRAWINGS

The above and other objects, features and advantages of the present invention will be more clearly understood from the following detailed description taken in conjunction with the accompanying drawings, in which:

FIGS. 3A to 3G are timing diagrams of signals in components in FIG. 2;

DETAILED DESCRIPTION OF THE PREFERRED EMBODIMENT

Figure 1:
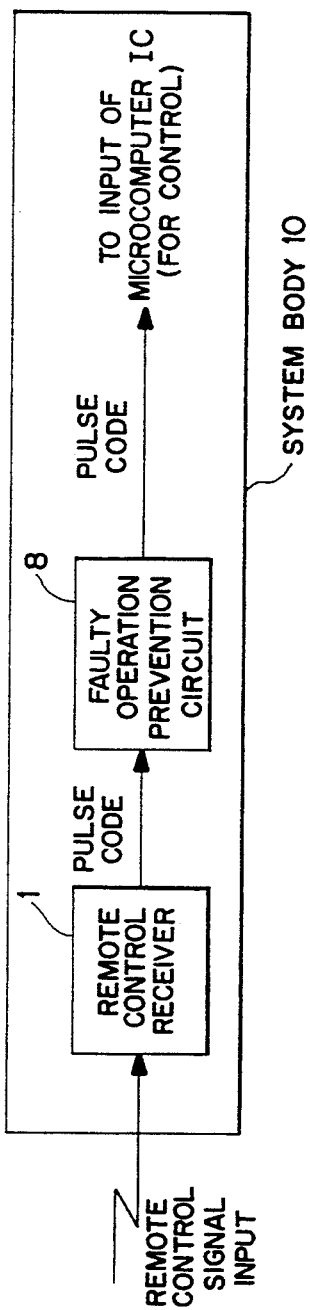
FIG. 1 is a schematic block diagram of a faulty operation prevention circuit for an infrared-ray remote controller in accordance with the present invention.
Figure 6:
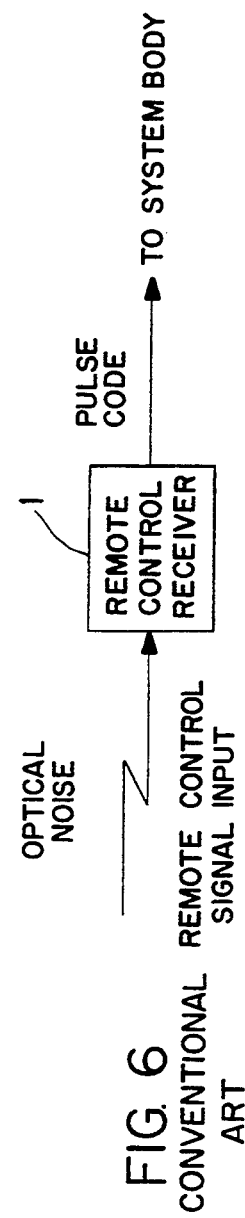
FIG. 6 is a schematic block diagram of a conventional remote control reception apparatus.

FIG. 1, illustrates a schematic block diagram of a faulty operation prevention circuit 8 for an infrared-ray remote controller in accordance with the present invention. The remote control receiver 1 in this drawing is the same as that in FIG. 6 and a detailed description thereof will thus be omitted.

Figure 4:
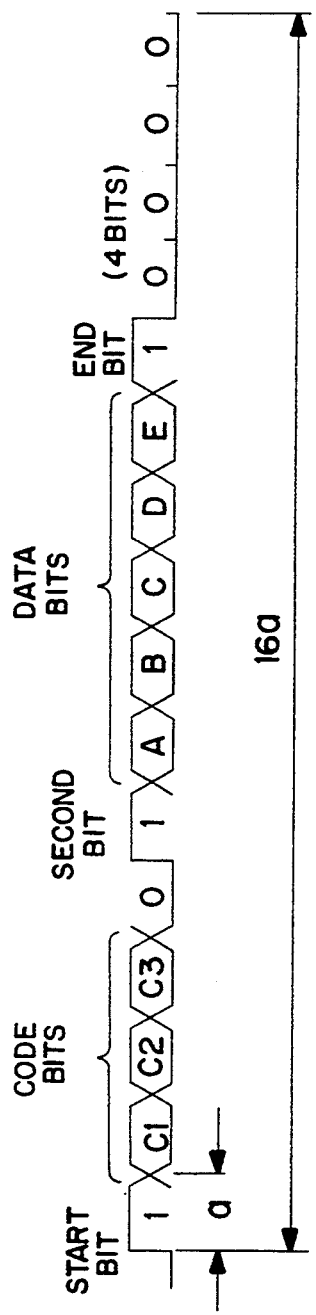
FIG. 4 is a data format of a transmission signal from the infrared-ray remote controller.
Figure 5:
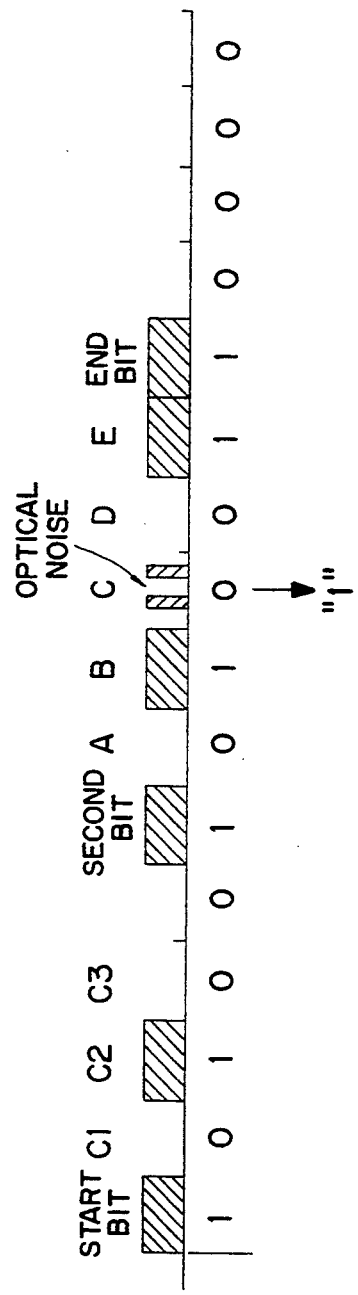
FIG. 5 is a data format of the transmission signal in FIG. 4 in which an optical noise is contained.

The faulty operation prevention circuit 8 comprises an optical noise detector 9 connected to the output of the remote control receiver 1. The optical noise detector 9 is adapted to set the 4 redundancy bits of the transmission signal from the infrared-ray remote controller to the "H" levels. As a result, the transmission signal from the infrared-ray remote controller cannot be received by the system body 10. As shown in FIGS. 4 and 5, the 4 redundancy bits are present subsequently to the END bit of the transmission signal from the infrared-ray remote controller.

Figure 2:
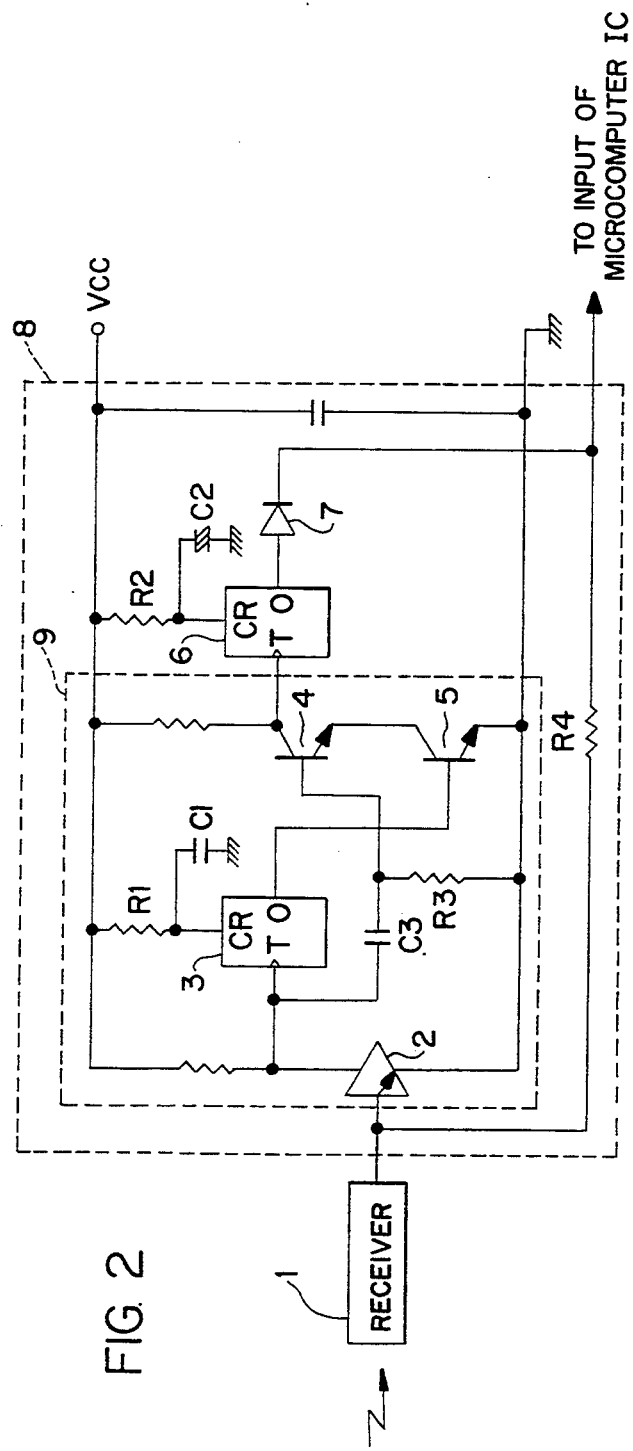
FIG. 2 is a detailed circuit diagram of an optical noise detector in the circuit in FIG. 1 in accordance with an embodiment of the present invention.

Referring to FIG. 2, there is shown a detailed circuit diagram of the optical noise detector 9 in the faulty operation prevention circuit 8 in FIG. 1 in accordance with an embodiment of the present invention. As shown in this drawing, the optical noise detector 9 includes an inverter 2 for inverting the output pulse code signal from the remote control receiver 1, and a first pulse generation circuit 3 for generating pulses of predetermined widths in response to an output signal from the inverter 2.

Transistors 4 and 5 are turned on only when the optical noise is contained in the transmission signal from the infrared-ray remote controller.

The optical noise detector 9 also includes a second pulse generation circuit 6 for generating pulses of another predetermined width in response to output signals from the transistors 4 and 5, and a diode 7 for preventing the output pulse code signal from the remote control receiver 1 from flowing reversely when it is the "H" level.

The width of each pulse from the first pulse generation circuit 3 is determined by a time constant of a time constant circuit of a resistor R1 and a condenser C1. The width of the pulse from the second pulse generation circuit 6 is determined by a time constant of a time constant circuit of a resistor R2 and a condenser C2.

The operation of the faulty operation preventing circuit 8 with the above-mentioned construction in accordance with the present invention will hereinafter be described in detail with reference to FIGS. 3A to 3G.

FIGS. 3A to 3G are timing diagrams of the signals in the components in FIG. 2. FIG. 4 is the data format of the transmission signal from the infrared-ray remote controller and FIG. 5 is the data format of the transmission signal in FIG. 4 in which the optical noise is contained.

The transmission signal from the infrared-ray remote controller as shown in FIG. 3A is applied to the inverter 2. The transmission signal as shown in FIG. 3A is the same as that in FIG. 5. In FIG. 3A, pulses indicated by oblique lines are optical noise pulses contained in the transmission signal from the infrared-ray remote controller.

The signal as shown in FIG. 3B is outputted from the inverter 2. The output signal from the inverter 2 as shown in FIG. 3B is applied to the first pulse generation circuit 3 and a differential circuit of a resistor R3 and a condenser C3.

The first pulse generation circuit 3 triggers at falling edges of the output signal from the inverter 2 as shown in FIG. 3B and thus generates pulses of width a as shown in FIG. 3C, each of which is determined by the time constant of the time constant circuit of the resistor R1 and the condenser C1. As shown in FIG. 3C, the first pulse generation circuit 3 triggers at the falling edges of the optical noise pulses and thus generates the pulses of width a. The pulses generated at that time are not varied in level although the pulses subsequent to the optical noise pulses are the "H" level as shown in FIG. 3B, since the time constant of the time constant circuit of the resistor R1 and the condenser C1 is large. In the preferred embodiment of the present invention, the width of each pulse from the first pulse generation circuit 3 is substantially the same as that of each bit of the transmission signal from the infrared-ray remote controller. The output pulses from the first pulse generation circuit 3 as shown in FIG. 3C are applied to a base of the transistor 5.

The differential circuit of the condenser C3 and the resistor R3 differentiates the output signal from the inverter 2 as shown in FIG. 3B and outputs the differentiated signal as shown in FIG. 3D. The differentiated signal from the differential circuit as shown in FIG. 3D is applied to a base of the transistor 4. Only when the signals as shown in FIGS. 3C and 3D are the "H" levels, the transistors 5 and 4 are turned on. In other words, the transistors 5 and 4 are simultaneously turned on only when the signals as shown in FIGS. 3C and 3D are simultaneously the "H" levels.

FIG. 3E is a waveform diagram of a signal in the case where the transistors 5 and 4 are simultaneously turned on. From this drawing, it can be seen that the signals as shown in FIGS. 3C and 3D are simultaneously the "H" levels when the optical noise is contained in the transmission signal from the infrared-ray remote controller. In this case, the signal as shown in FIG. 3E is the "H" level in intervals other than the widths of the optical noise pulses.

Subsequently, the second pulse generation circuit 6 triggers at a falling edge of the signal as shown in FIG. 3E which indicates the simultaneous ON of the transistors 4 and 5.

The second pulse generation circuit 6 triggers at the falling edge of the signal as shown in FIG. 3E and thus generates the pulse of the width ($a \times 16$) of the "H" level as shown in FIG. 3F, which is determined by the time constant of the time constant circuit of the resistor R2 and the condenser C2.

FIG. 3G is a waveform diagram of the pulse from the second pulse generation circuit 6 after passing through the diode 7. As shown in this drawing, the "H" level interval of FIG. 3F is naturally maintained. As a result, the pulse as shown in FIG. 3G is transferred to the system body 10.

With the pulse width $16a$ of the "H" level transferred as shown in FIG. 3G, the 4 redundancy bits subsequent to the END bit of the transmission signal from the infrared-ray remote controller have "H" levels, thereby causing the system body to recognize no transmission signal from the infrared-ray remote controller. As a result, no operation is performed by the system body 10.

On the other hand, in the absence of optical noise in the transmission signal from the infrared-ray remote controller, the signals as shown in FIGS. 3C and 3D can not simultaneously be the "H" levels and, thus, the transistors 5 and 4 can not simultaneously be turned on, resulting in no operation of the second pulse generation circuit 6. In this case, the transmission signal as shown in FIG. 3A is transferred through the resistor R3 to the system body 10. Therefore, the system body 10 is normally operated.

As apparent from the above description, according to the present invention, the transmission signal from the infrared-ray remote controller is not received by the system body 10 when it is mixed with optical noise from a source such as, for example, a fluorescent lamp. Therefore, the faulty operation of the system body 10 can certainly be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A faulty operation prevention circuit for use with an infrared-ray remote controller comprising:
   inversion means for inverting a transmission signal from said infrared-ray remote controller;
   first pulse generation means for generating output pulses in response to an output signal from said inversion means, each of said pulses having a first width;
   noise identification means for identifying an optical noise contained in the transmission signal from said infrared-ray remote controller in response to an output signal from said inversion means and the output pulses from said first pulse generation means; and
   second pulse generation means for generation a pulse in response to an output signal from said noise identification means, said pulse having a second width;
   wherein a system body does not receive the transmission signal from said infrared-ray remote controller in response to the pulse from said second pulse generation means when the optical noise is contained in the transmission signal from said infrared-ray remote controller, so that a faulty operation of the system body can be prevented.

2. The faulty operation prevention circuit of claim 1, wherein said first pulse generation means includes:
   a time constant circuit for determining the first pulse width, said time constant circuit including a resistor and a condenser.

3. The faulty operation prevention circuit of claim 1, wherein said noise identification means includes:
   a first transistor driven in response to a signal generated by differentiating the output signal from said inversion means; and
   a second transistor driven in response to the output pulses from said first pulse generation means.

4. The faulty operation prevention circuit of claim 1, wherein said second pulse generation means includes:
   a time constant circuit for determining the second pulse width, said time constant circuit including a resistor and a condenser.

5. The faulty operation prevention circuit of claim 1 or claim 2, wherein the first pulse width is substantially the same as a width of each bit of the transmission signal from said infrared-ray remote controller.

6. The faulty operation prevention circuit of claim 1 or claim 4, wherein the second pulse width is substantially the same as a width of 16 bits of the transmission signal from said infrared-ray remote controller.

7. The faulty operation prevention circuit of claim 1, wherein the transmission signal from said infrared-ray remote controller has 16 bits, said 16 bits including an END bit and 4 reduncancy bits, said system body receiving no transmission signal from said infrared-ray remote controller when said 4 redundancy bits have high levels.

8. A method of preventing faulty operation of a system body, controllable by an infrared-ray remote controller, comprising the steps of:
   a) inverting a transmission signal from the infrared-ray remote controller to produce an inverted transmission signal;
   b) generating output pulses in response to the inverted transmission signal, each of said pulses having a first width;
   c) identifying an optical noise contained in the transmission signal in response to the inverted transmission signal and the output pulses and outputting a noise signal; and
   d) generating a pulse in response to the noise signal, said pulse having a second width, wherein the system body does not receive the transmission signal from the infrared-ray remote controller in response to the pulse when the optical noise is contained in the transmission signal from the infrared-ray remote controller, so that a faulty operation of the system body can be prevented.

9. The method of claim 8, wherein said step a) includes determining the first pulse width from a time constant circuit.

10. The method of claim 8, wherein said step b) includes:
    driving a first transistor in response to a signal generated by differentiating the inverted transmission signal, and
    driving a second transistor in response to the output pulses.

11. The method of claim 8, wherein said step c) includes:
    determining the second pulse width from a time constant circuit.

12. The method of claim 8 or claim 9, wherein the first pulse width is substantially the same as a width of each bit of the transmission signal from the infrared-ray remote controller.

13. The method of claim 8 or claim 11, wherein the second pulse width is substantially the same as a width of 16 bits of the transmission signal from the infrared-ray remote controller.

14. The method of claim 8, wherein the transmission signal from said infrared-ray remote controller has 16 bits, said 16 bits including an END bit and 4 redundancy bits, said system body receiving no transmission signal from said infrared-ray remote controller when said 4 redundancy bits have high levels.

* * * * *